United States Patent [19]

Gruson

[11] 4,276,577
[45] Jun. 30, 1981

[54] MOTOR VEHICLE BATTERY CHARGING INSTALLATION

[75] Inventor: Michel Gruson, Creteil, France

[73] Assignee: Ducellier & Cie, France

[21] Appl. No.: 6,167

[22] Filed: Jan. 24, 1979

[30] Foreign Application Priority Data

Feb. 2, 1978 [FR] France .............................. 78 02850

[51] Int. Cl.³ .......................... H02H 7/20; G05F 1/58
[52] U.S. Cl. ........................................ 361/91; 361/18; 361/20; 322/28; 322/99
[58] Field of Search ...................... 361/18, 21, 20, 91, 361/98, 88, 89; 322/28, 25, 99, 22; 320/64, 68, 48; 307/10 BP; 340/635, 636, 645, 660, 662, 661

[56] References Cited

U.S. PATENT DOCUMENTS

| 3,492,559 | 1/1970 | Harris | 322/99 |
| 3,612,982 | 10/1971 | Jones et al. | 322/28 |
| 3,942,096 | 3/1976 | Itoh et al. | 322/28 |
| 3,942,097 | 3/1976 | Itoh et al. | 361/18 X |
| 4,023,089 | 5/1977 | Arakane | 322/99 X |

Primary Examiner—Patrick R. Salce

[57] ABSTRACT

A motor vehicle battery charging installation includes an alternator/rectifier combination which is controlled by a voltage regulator and is connected to the battery. A warning lamp is connected in series with the collector-emitter of a control transistor across the battery. The voltage at the base of the control transistor is determined by a resistor/capacitor/diode network connected to the rectifier output and to a phase point of the alternator to turn the lamp on whereas the alternator is producing no output. A zener diode is connected to the rectifier output and to an auxiliary input of the regulator to take control should the connection between the alternator and the battery become interrupted. Current flow through this zener diode is detected by a second transistor with its collector-emitter parallel with the first-mentioned transistor so as overridingly to illuminate the lamp in the event of the zener diode becoming conductive.

3 Claims, 2 Drawing Figures

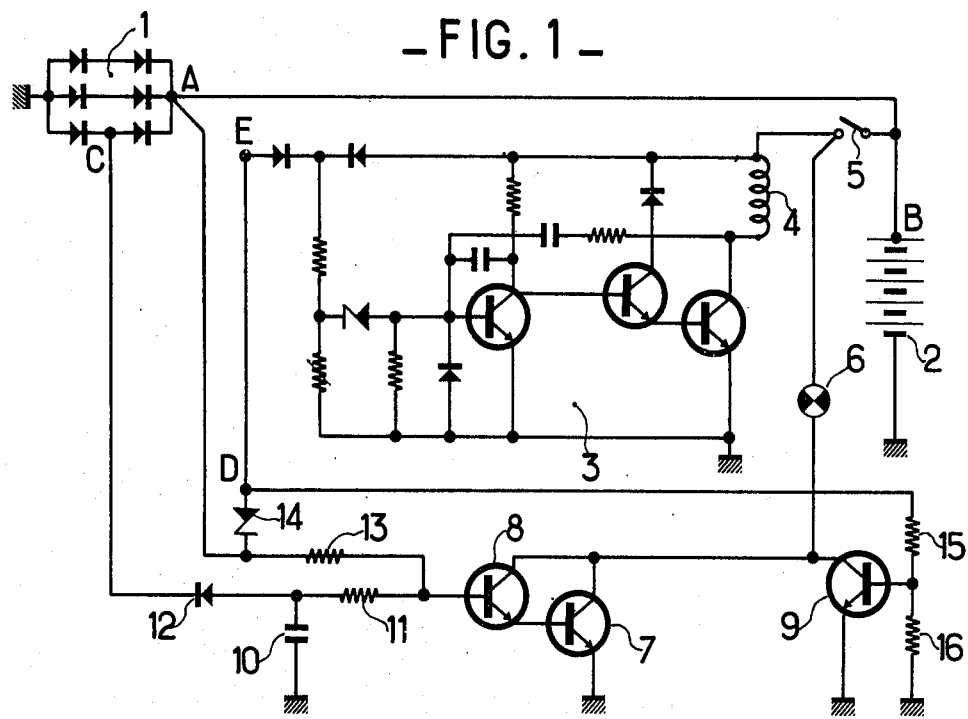
−FIG. 1−
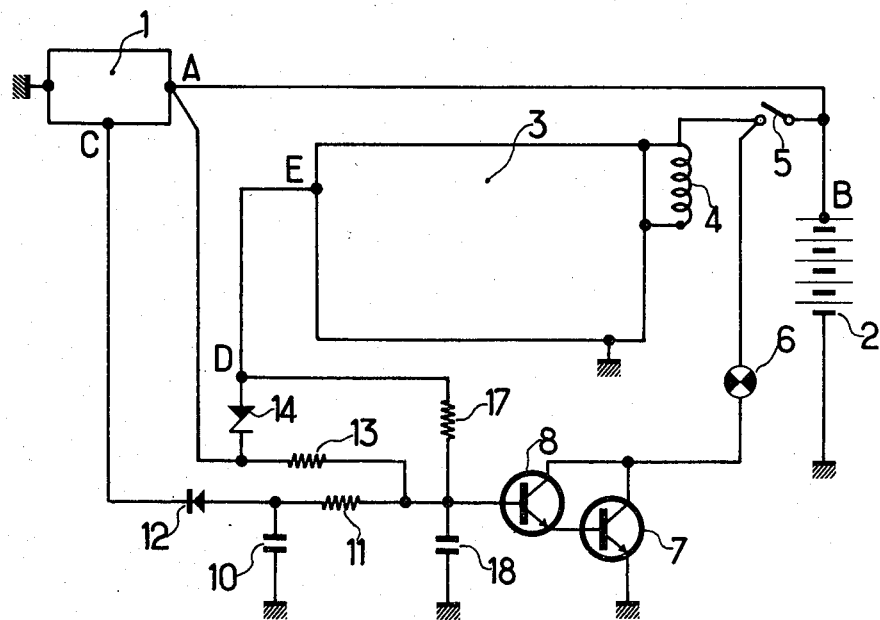
−FIG. 2−

MOTOR VEHICLE BATTERY CHARGING INSTALLATION

This invention relates to a motor vehicle battery charging installation, of the kind including an alternator which delivers alternating current rectified by diodes and charges the battery under the control of a regulator which acts on the excitation winding of the alternator.

Devices are known for indicating the voltage of a battery when this voltage is below a selected value, or becomes greater than another selected value, but these indications are only present when the operating fault exists and in effect require the battery voltage to become critical before the signal is produced.

Devices are known which indicate a cessation of the alternator output but which do not indicate failure to charge the battery by disconnection between the battery and alternator positive terminals.

Devices are also known for providing protection when an interruption occurs between the battery and alternator positive terminals, which devices are arranged in such a manner as also to control the alternator output but they do not indicate the fault visually because the warning lamp does not relight.

The present invention has for an object to overcome these disadvantages and particularly to indicate visually, on the one hand, a cessation of the alternator output due to failure of, for example, the drive belt, the excitation, or the regulator and, on the other hand, an interruption between the positive terminal of the battery and the positive terminal of the alternator.

A battery charging installation according to the invention comprises the combination of an alternator, a rectifier connecting the alternator to the battery to be charged, a voltage regulator connected to control the output of the alternator in accordance with the battery voltage, a warning lamp and a control transistor therefor connected across the battery, means for biasing said transistor to conduct, means for turning said transistor off when the alternator is producing an output, a zener diode connecting the rectifier output to an auxiliary input of the voltage regulator to provide regulation at an increased voltage level should the connection between the alternator and the battery be interrupted and means controlled by current flow through said zener diode for overridingly said warning lamp when the zener diode conducts.

In the drawings:

FIG. 1 is a diagram of one example of a vehicle charging installation according to the invention.

FIG. 2 is a diagram of a second example of the invention.

The charging installation is constituted in known manner by an alternator/rectifier combination 1, connected to the battery 2, and a regulator 3 which controls the current passing through the excitation winding 4 of the alternator 1. The positive terminal A of the alternator/rectifier 1 is connected to the positive terminal B of the battery 2. The regulator 3 and the excitation winding 4 are fed by the battery through a switch 5.

An indicator lamp 6 is controlled by a transistor 7 of the N.P.N. type connected in series with the lamp 6 and the switch 5, which transistor 7 is controlled by the output of the alternator.

The control of the transistor 7 is effected by means of a transistor 8 arranged as a Darlington pair with the transistor 7. The base of the transistor 8 is connected to the output A of the alternator through a resistor 13, and also to one phase point C of the alternator through a resistance 11 and a diode 12 which has its cathode connected to phase point C. A capacitor 10 is connected at one side to the anode of the diode 12 and at the other side to the vehicle earth.

The operation of such a device is known; in effect, when the vehicle starts up, that is to say when the switch 5 is closed and the alternator is delivering no current, the voltages at A and B are equal to the battery voltage, the Darlington pair 7, 8 is turned on by the resistors 13 and 11, the transistor 7 conducts and the lamp 6 lights. As soon as the alternator provides an output, detection and filtering by means of the capacitor 10 of the negative voltage appearing at C, blocks the Darlington pair 7, 8 and the lamp 6 goes out thereby indicating that the installation is operating correctly.

In the event that the alternator fails to provide an output, the voltage at point C is not supplied, the base of the transistor 8 is once again polarised by the resistance 13, the transistor 7 conducts again and the lamp 6 relights, indicating an operational fault.

A zener diode 14 provides at D a second regulation threshold which permits an interruption in the conductor A, B to be detected, that is to say between the positive terminals of the alternator and the battery. The zener diode 14 provides an auxiliary input to the regulator 3, so that in this circumstance the alternator output is regulated to a higher than normal voltage.

In FIG. 1, this second regulation threshold controls the state of conduction of a transistor 9 which has its collector-emitter in parallel with the transistor 7 and its base connected to the junction of two resistors 15 and 16 in series between the anode of zener diode 14 and the vehicle earth.

When no interruption exists between A and B, the potential at A is controlled so that the zener diode 14 is not conducting, the transistor 9 is thus blocked and the lamp 6 is not lit.

When an interruption occurs between A and B, the potential at A increases, the zener diode 14 becomes conducting and the base of the transistor 9 is polarised by the resistors 15 and 16, the transistor 9 becomes conducting and the lamp 6 relights, indicating an operational fault.

In FIG. 2, the zener diode 14 controls the Darlington pair 7, 8, the transistor 9 and the resistance bridge 15, 16 being omitted. A resistor 17 is connected between the point D and the base of the transistor 8.

Thus, when the zener diode 14 is conducting, the potential at the base of the transistor 8 is raised, by virtue of the careful selection of the values of the various resistors 11, 13, 17, the transistor 8 becomes conducting, as does the transistor 7 and consequently the lamp 6 relights.

A capacitor 18 is connected between the base of the transistor 8 and earth in order to absorb over-voltages which are liable to appear at the point D due to the conduction of the zener diode.

There is thus obtained a device which permits the instantaneous visual indication of a fault in the functioning of a motor vehicle battery charging device.

I claim:

1. A motor vehicle battery charging installation comprising the combination of an alternator having an output, a rectifier connecting the alternator to the battery to be charged, a voltage regulator connected to control the output of the alternator in accordance with the battery voltage, a warning lamp and a control transistor means therefor connected across the battery, means connected directly between the control transistor means and the rectifier for biasing said control transistor means to conduct and thereby energize and illuminate said warning lamp when said alternator fails to produce its output, means connected directly between the control transistor means and the rectifier for turning the said control transistor means off when the alternator is producing an output, a zener diode connected directly between the rectifier output and an auxiliary input of the voltage regulator to provide regulation at an increased voltage level should the connection between the alternator and the battery be interrupted, and means controlled by current flow through said zener diode for overridingly illuminating said warning lamp when the said zener diode conducts, said control transistor means being operative to control the energization of the said warning lamp to indicate the failure of the alternator to produce an output and to further indicate the occurrence of an interruption of the connection between said alternator and said battery.

2. An installation as claimed in claim 1 in which said means controlled by current flow through said zener diode for overridingly illuminating the warning lamp comprises a second control transistor having its collector emitter connected in parallel with the said control transistor means and having its base connected to the junction of two series resistors connected between the vehicle earth and the said auxiliary input of the voltage regulator.

3. An installation as claimed in claim 1 in which said means controlled by current flow through said zener diode for overridingly illuminating said warning lamp when the said zener diode conducts comprises a resistor connecting said auxiliary input of the voltage regulator to one terminal of a capacitor, the other terminal of which is connected to the vehicle earth, said one terminal of the capacitor being connected to the base of said control transistor means.

* * * * *